United States Patent [19]

Fujisaki et al.

[11] Patent Number: 4,967,190
[45] Date of Patent: Oct. 30, 1990

[54] METHOD OF AND APPARATUS FOR CONTROLLING SCREEN DISPLAY

[75] Inventors: Kazuhiro Fujisaki; Hiromi Fujisaki, both of Hadano, Japan

[73] Assignee: Hitachi, Ltd., Tokyo, Japan

[21] Appl. No.: 216,655

[22] Filed: Jul. 7, 1988

[30] Foreign Application Priority Data

Jul. 10, 1987 [JP] Japan .................. 62-172506

[51] Int. Cl.⁵ .............................................. G09G 1/00
[52] U.S. Cl. ................................... 340/700; 340/712; 340/790
[58] Field of Search ............... 340/706, 711, 712, 747, 340/790; 364/900, 518, 521

[56] References Cited

U.S. PATENT DOCUMENTS

| | | | |
|---|---|---|---|
| 4,413,314 | 11/1983 | Slater et al. | 340/706 |
| 4,431,870 | 2/1984 | May et al. | 340/712 |
| 4,516,156 | 5/1985 | Fabris et al. | 340/712 |
| 4,611,306 | 9/1986 | Crehan et al. | 340/747 |
| 4,648,062 | 3/1987 | Johnson et al. | 340/712 |
| 4,742,558 | 5/1988 | Ishibashi et al. | 340/747 |
| 4,763,356 | 8/1988 | Day, Jr. et al. | 340/712 |
| 4,821,211 | 4/1989 | Torres | 340/747 |
| 4,831,552 | 5/1989 | Scully et al. | 364/521 |
| 4,910,963 | 3/1990 | Franke et al. | 340/747 |

FOREIGN PATENT DOCUMENTS

60-156138  8/1985  Japan .

Primary Examiner—Alvin Oberley
Assistant Examiner—M. Fatahiyar
Attorney, Agent, or Firm—Antonelli, Terry, Stout & Kraus

[57] ABSTRACT

In a screen display control of a terminal effecting screen display through communications with a host computer via a communication line, there are provided on the terminal side a file in which screen data to be frequently used is subjected to a download or is loaded and a reference table to which a systematic correspondence list associated with display screen data, screen selection data, and next screen data is registered. When screen data being displayed on a display of the terminal is already registered as display screen data to the reference table, if screen select data is inputted, the next screen data registered in association with the corresponding display screen data and the input select data is retrieved from the reference table so that the next screen data is extracted from the screen data file so as to be displayed on the display. When the screen data being displayed is missing in the reference table, in response to an input of the next screen select data, the input data or information associated therewith is transmitted to the host computer so as to request for the next screen data or information specifying the next screen data.

8 Claims, 4 Drawing Sheets

FIG. 2

SCREEN CONTROL TABLE

22

| MENU | SUB – MENU | | | | |
|---|---|---|---|---|---|
| DISPLAY SCREEN | CORRESPONDENCE 1 | | CORRESPONDENCE 2 | | |
| | SELECTION DATA | NEXT SCREEN | SELECTION DATA | NEXT SCREEN | |
| SCREEN A | "1" | SCREEN B | "2" | SCREEN C | |
| SCREEN B | "1" | SCREEN B1 | "2" | SCREEN B2 | |
| SCREEN C | "1" | SCREEN C1 | "2" | SCREEN C2 | |
| | | | | | |

METHOD OF AND APPARATUS FOR CONTROLLING SCREEN DISPLAY

BACKGROUND OF THE INVENTION

The present invention relates to a method of and an apparatus for controlling display of screen data communicated between a host computer and a terminal equipment called a video data terminal, and in particular, to a method of and an apparatus for controlling communications of screen data by use of a communication line such as a packet network.

In the prior art, according to the method of controlling a screen display of the most common terminal equipment (to be simply referred to as a terminal herebelow), screen data is received from a host computer (to be simply referred to as a host herebelow) so as to display the screen data on a display of the terminal and then data to select the next screen is inputted and is transmitted to the host, which as a result causes the host screen data for the next display to be received from the host, thereby displaying the screen data.

As another conventional example of the screen display control method, there has been known a method in which there is beforehand disposed on the side of a terminal equipment a file containing fixed screen data. That is, the primary screen of the host is subjected to a download or is loaded such that when the host sends only the data associated with a screen number is sent to the terminal, the corresponding fixed screen data is read from the file on the terminal side so as to be displayed on a display. In addition, when additional screen data is necessary for the fixed screen data, the additional screen data is generated in the host and is then sent to the terminal. For details, refer to the JP-A-60-156138, for example.

However, in the former method, although the constitution of the terminal can be simplified, the screen data is transmitted from the host to the terminal each time the screen data is changed, which leads to a problem that the amount of data transmitted via the communication line becomes great and that the frequency of line utilization as well as the period of time of line occupancy are increased and hence the utilization efficiency of the communication line is decreased. In addition, there exists a problem that a long period of time is required for a switching operation between displayed screens.

On the other hand, according to the latter method, since the file containing the fixed screen data is disposed on the terminal side, the transmission of the fixed screen data is unnecessitated and the amount of data to be transmitted between the terminal and the host is considerably minimized; however, in a case where the screen data is systematic data such as those configured in a tree structure, each time the present screen is switched to the subsequent screen, it is required to receive a screen number (ID) data and additional screen data from the host, which leads to a problem that a long display switch time is necessary and that the number of data transmissions to the host is kept unchanged as compared with the former method.

SUMMARY OF THE INVENTION

It is therefore an object of the present invention to provide a method of and an apparatus for controlling screen display in a terminal equipment in which the number of data transmissions to the host computer and the display switch time can be reduced.

In order to achieve the object above, according to a feature of the present invention, in the screen display control between a terminal equipment such as a video data terminal and a higher-level system such as a host computer having a display format definition, there are provided on the terminal side a file of screen data and a table to which a systematic correspondence list associated with display screen data, screen select data, and next screen data are registered such that in a case where screen select data is inputted when screen data being displayed is beforehand registered to the table as display screen data, the next screen data registered in association with the display screen data and the pertinent input data is retrieved from the table such that the pertinent next screen data is read from the file so as to be displayed on a display of the terminal and that on the other hand in a case where screen select data is inputted to select the next screen when screen data being display is not beforehand registered to the table as display screen data, in order to request the next screen data or screen specify information (ID), the pertinent input data or data associated therewith is sent to the host so as to attain the next screen data or specify information, thereby displaying the screen data.

According to the constitution above, for the screen data including characters and ruled lines beforehand registered to the table, the display screen can be changed only in the terminal without necessitating a communication with the host, namely, only when a screen to be processed in the host becomes necessary because of the pertinent data is not registered to the table, the terminal issues a request to the host for data of the next screen or information associated therewith, and then the host sends the data or the specified information to the terminal. Incidentally, in general application jobs to be conducted in the terminal, there exist a lot of screen data items, like screen data for the menu selecting operation, for which it is only necessary that the file is referenced to send the screen select data to the host, in other words, the screen data items need not be processed. In consequence, the screen data for which the processing of the host is not required is beforehand registered to the table so as to greatly minimize the number of data transmissions via the communication line, namely, the number of packets to be transmitted is considerably lowered, the utilization efficiency of the line is increased, and the line utilization cost is reduced. In addition, in a case where the display switch operation can be effected without any communication with the host, the period of time required to switch the display screen can be greatly minimized. Although the present invention also includes a case where a terminal having a function substantially identical to that of the host computer is employed as the host in the communication, since the object of the communication is primarily an application program of a routine job, a communication line is employed for the communication between the terminal and the host in many cases.

BRIEF DESCRIPTION OF THE DRAWINGS

The present invention will be apparent from the following detailed description taken in conjunction with the accompanying drawings in which:

FIG. 2 is an explanatory diagram useful to explain a screen control table associated with the display control;

DESCRIPTION OF THE PREFERRED EMBODIMENTS

Figure 1:
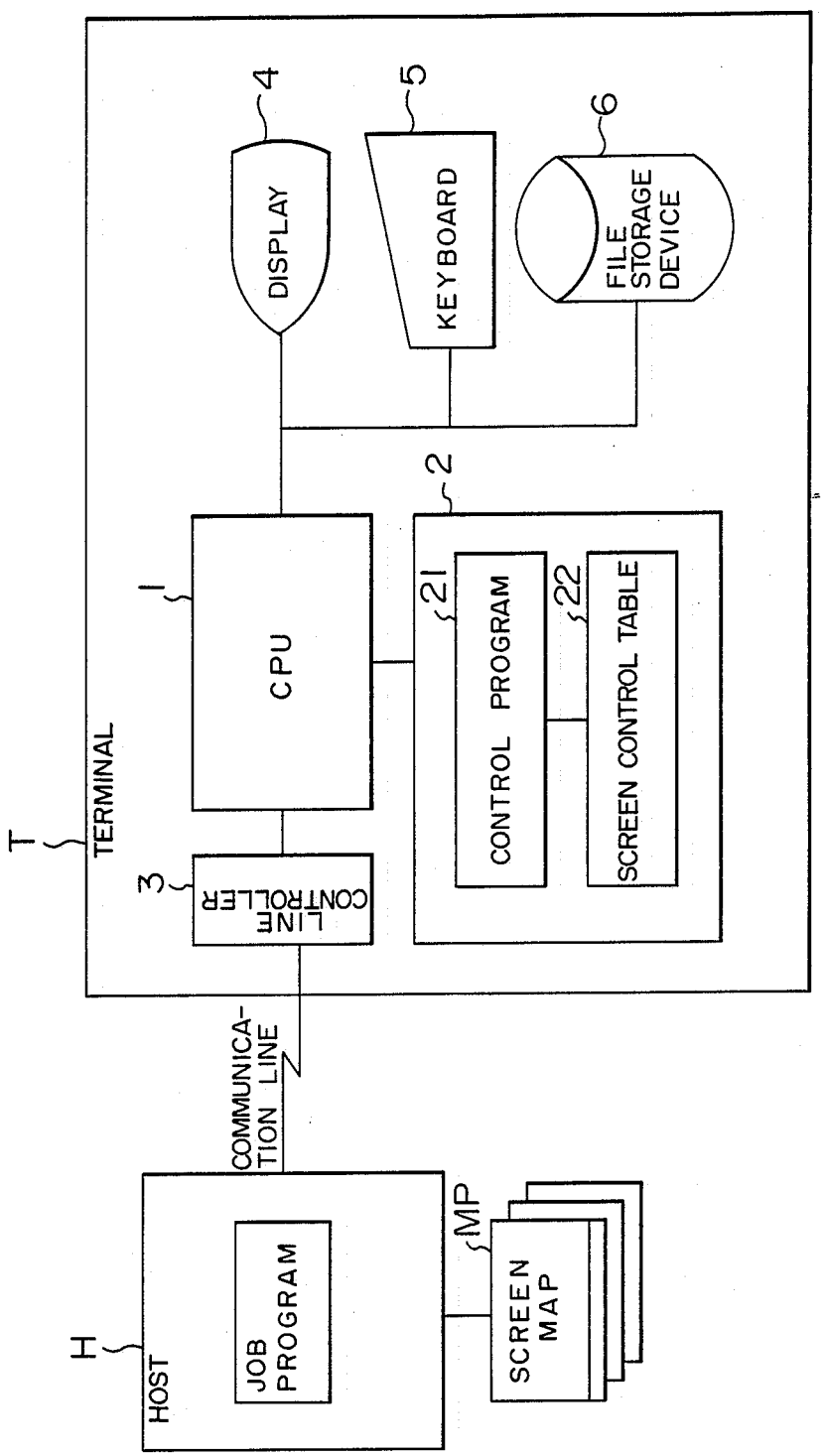
FIG. 1 is a configuration diagram of a terminal to which the present invention is applied.

Referring now to the drawings, description will be given of an embodiment according to the present invention.

FIG. 1 is a configuration diagram of a terminal T like a work station as an embodiment according to the present invention. This configuration includes a central processing unit (CPU) 1 to control the respective sections of the terminal T and to execute data processing and a storage 2 to be accessed from the CPU 1. In the storage 2, there are stored, for example, a control program 21 to be executed by the CPU 1 and a screen control table 22 disposed for the display control. The display control is effected by the control program 21, namely, is physically executed by the CPU 1 according to the control program 22. The system further includes a line controller 3 to conduct data transmission and reception with an upper-level system H like a host computer via a communication line, a display 4, a keyboard 5 from which the user can input a screen display instruction in an interactive fashion, and a file storage device 6 to store therein a file containing screen data such as those of a routine job. The host H comprises a screen map memory MP and the content of the file 6 is a copy of a portion of the content of the screen map memory MP in an ordinary case.

FIG. 2 is an explanatory diagram for explaining the screen control table 22, which is loaded with a number (ID) of a display screen data and a number of the next screen data corresponding to an input data in the display. According to the data registration in the example of FIG. 2, assuming that the data of screen A is being displayed, when data "1" is inputted, data of screen B is set as the next screen data; whereas, when data "2" is inputted, data of screen C is assigned as the next screen data. Alternatively, there may be prepared many next screen data, for example, for correspondence mode 3, correspondence mode 4, ..., and correspondence mode n. Although the data of this example of the table is configured in an image data system of a tree structure, various kinds of data structures can be employed depending on purposes.

Figure 3:
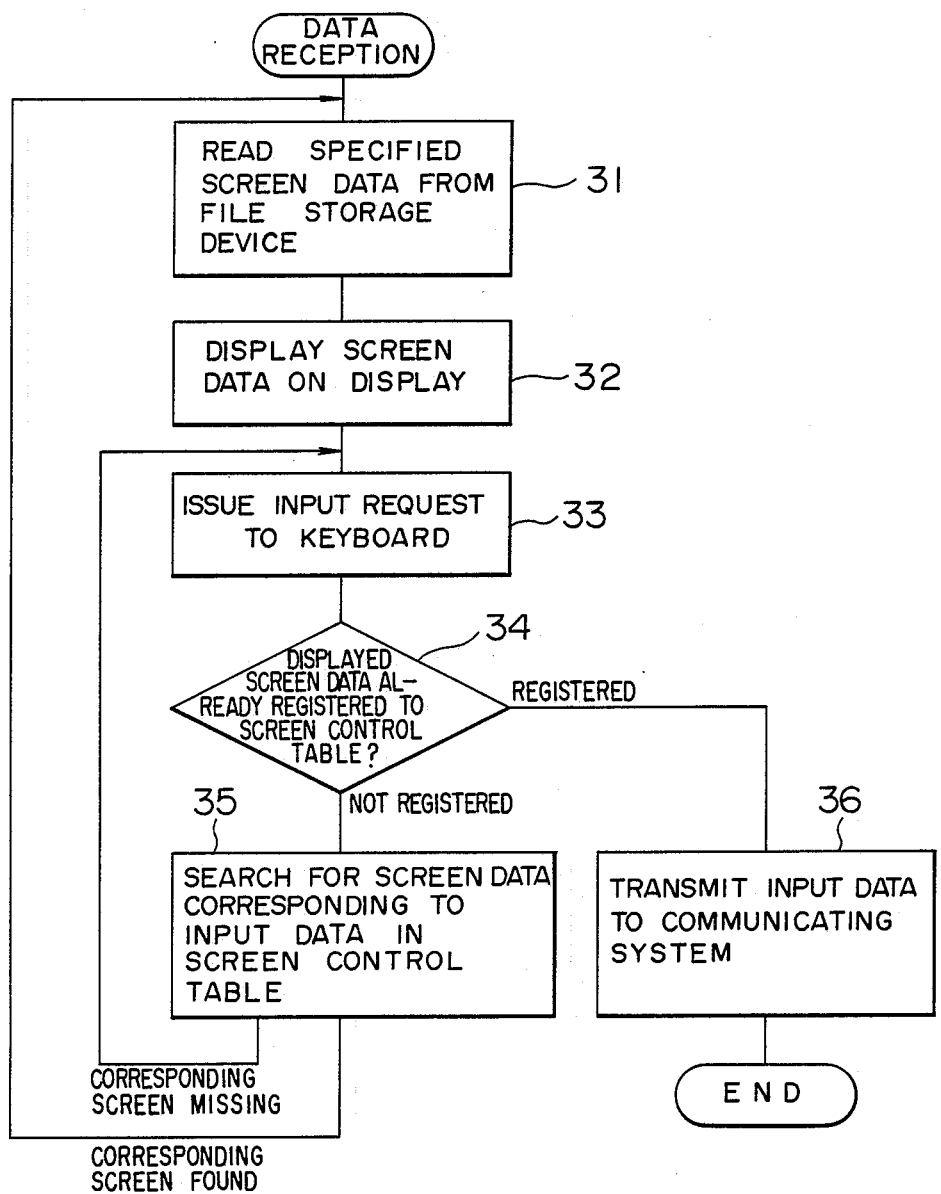
FIG. 3 is a general flowchart showing the operation of the display control.

Referring next to the flowchart of FIG. 3, description will be given of the operation related to the display control of a terminal constituted as described above.

The line controller 3 conducting a protocol control, on receiving data via an application program from the host, notifies the reception to the control program 21 (physically, to the CPU 1) and transfers the data thereto. The control program 21 (physically, the CPU 1) analyzes the received data such that, as shown in FIG. 3, the control program 21 reads the screen data specified by the host from the file storage device 6 so as to display the data on the display 4 (steps 31 and 32) and then issues a request for a screen selection from the keyboard 5 (step 33). In this situation, a message of a screen select request is displayed on a screen of the display 4 so as to enable the user to effect the control processing in an interactive fashion.

Next, the control program 21 (physically, the CPU 1) effects a check to determine whether or not the screen data presently being displayed has been registered as display screen data to the screen control table 22 (step 34). If it is found that the screen data has been registered, the control program 21 retrieves from the screen control table the next screen data corresponding to the displayed screen data and the selection data specified from the keyboard 5 (step 35). When the next screen data corresponding thereto is found, the screen data is read from the file storage device 6 (step 31) so as to be displayed on the display 4. In a case where the corresponding next screen data is missing, the control program 21 issues again the selection request via the display 4 to the user (step 33). In this situation, however, an error message indicating the absence of the pertinent data is displayed on the display 4.

On the other hand, in a case where the screen data being displayed has not been registered as a display screen to the screen control table 22, the control program 21 sends a screen specify (select) data or information associated therewith via the line controller 3 to the host H (step 36). In this situation, through the processing effected by the host H, the next screen data is generated and is then transmitted to the terminal side; or, in a case where the screen data is beforehand stored in the file storage device 6, the specification number thereof is sent to the terminal side.

Concretely, assuming that the registration content of the screen control table 22 is as shown in FIG. 2, when selection data "1" is inputted, for example, while data of the screen A is being displayed, data of the screen B having a relation of succession is displayed as the next screen data; whereas, when selection data "2" is inputted, data of the screen C is displayed as the next screen data.

However, for example, when data "4" is inputted, since the corresponding next screen data is not beforehand registered to the screen control table 22, an error message is displayed and a keyboard input request is issued. In this situation, for example, if data "1" is inputted from the keyboard 5, the data of the screen B is displayed.

In addition, when selection data "1" is inputted, for example, while the data of the screen B is being displayed, the data of the screen B1 is displayed as the next screen data. Since the screen data has not been registered in the menu as the display screen data to the screen control table 22, the inputted data is transmitted to the host H while the screen B1 is being displayed and is then processed by an application program of the host H. In order to switch the screen display of the terminal, the host sends screen data of the screen map MP to the terminal; or, when the screen data is already stored in the file storage device 6 of the terminal, the host transmits the specification number thereof to the terminal.

Figure 4:
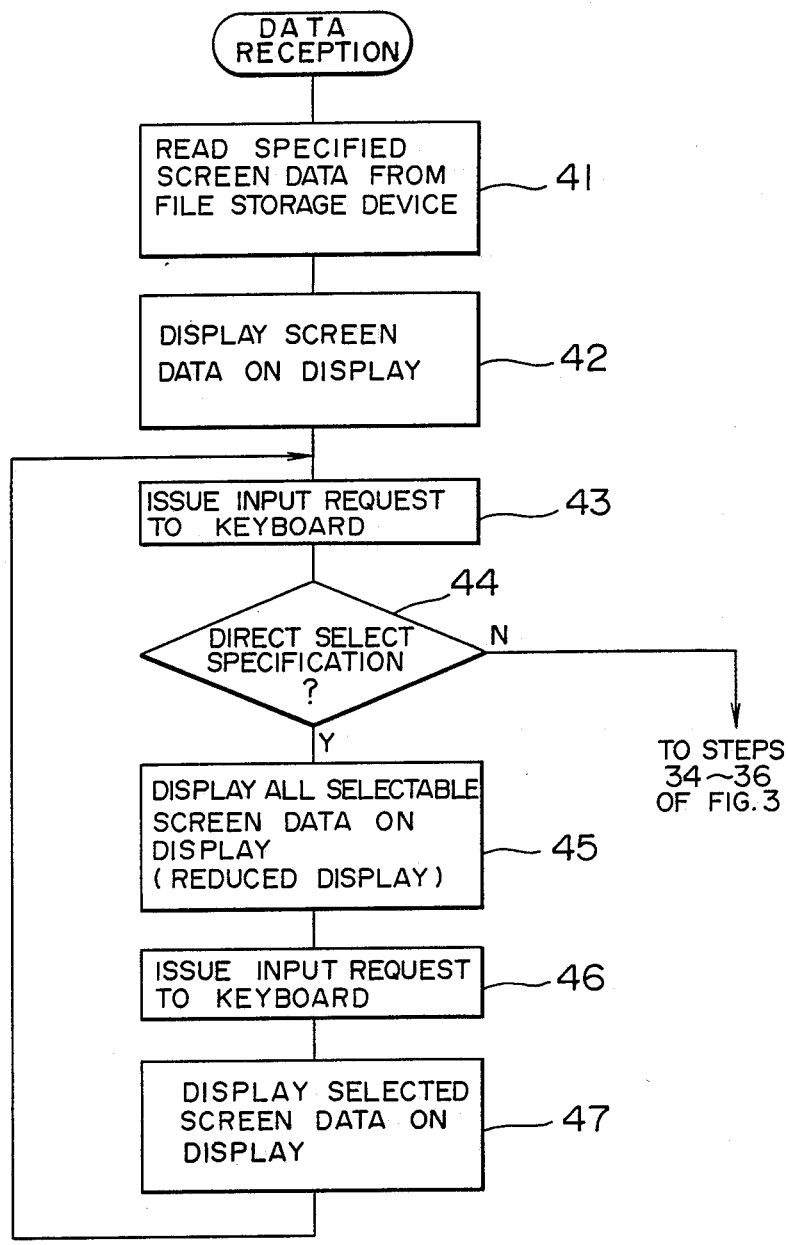
FIG. 4 is a detailed flowchart showing details of a portion of FIG. 3.

While an embodiment according to the present invention has been described, the present invention can be implemented with various modifications of the structure of the screen control table as well as the detailed procedures of the display control. For example, in the system of the image data of the tree structure of FIG. 2, the user can specify data of a lower-level menu screen in a jumping fashion without sequentially specifying screen data of the menus in a downward direction from the keyboard 5 by configuring the control program 21 as shown by steps 41–47, especially steps 44–47 in the flowchart of FIG. 4.

As can be seen from the description above, according to the present invention, for the group of screen data beforehand registered to the table and information representing relationships among the data, the display switch can be achieved only in the terminal without necessitating a communication with the host, and only when a screen to be processed by the host becomes necessary because the pertinent data is not beforehand registered to the table, screen request (select) data or information associated therewith is transmitted from the terminal to the host (including a terminal having the identical function); in consequence, the number of communications of data through communication lines such as the LAN, ISDN, a packet network, and the like can be greatly lowered, the line utilization efficiency is improved, and the period of time required for the display switch can be considerably minimized.

We claim:

1. A screen display control method in a terminal equipment having a display screen to be connected via a communication line to a host computer comprising the steps of:
   (a) providing a file of screen data and a table in which relational data between display screen data, input data to identify screens, and next screen data associated therewith are registered;
   (b) when a screen data being currently displayed is beforehand registered as a display screen data in said table, retrieving, in response to inputting of a selected screen indentify data, from said table next screen data registered in association with the display screen data and the input data so as to read the next screen data from said file and displaying the screen data on said display;
   (c) when the screen data being currently displayed is not beforehand registered as display screen data to said table, transmitting, in response to inputting of the selected screen identify data, the input data or data associated therewith to said host computer communicating with said terminal in order to request next screen data or information specifying the next screen data.

2. A screen display control method according to claim 1 wherein said table includes menus of a plurality of display screens and each said menu comprises at least a display screen as a submenu thereof.

3. A screen display control method according to claim 1 further including a control program for executing said steps (b) and (c) wherein said step (b) takes precedence over said step (c).

4. A screen display control method according to claim 1 wherein
   said step (a) configures, for screen data stored in said screen data file, information specified in association with screen data names in a hierarchical structure and stores the obtained screen data in said table and
   said steps (b) and (c) are controlled by a control program
   said control program including a program which is operative in response to a condition that the inputted screen identify data is located at a position accessible through a jump operation in the hierarchical structure in order to request said file for corresponding screen data.

5. A screen display control method according to claim 1 wherein contents of said table include a copy of a portion of the screen data and specification information stored in said host computer, and further including the step of
altering the contents of said table when screen data is added to said file.

6. A screen display control method in a terminal equipment which has a display and which is connected via a communication line to an external system comprising the steps of:
   (a) providing a file of screen data and a table in which relational information between display screen data, input data to identifying screens, and next screen data associated therewith is registered;
   (b) checking whether or not a screen data being displayed on said display is beforehand registered as a display screen to said table so as to judge whether or not said screen data is already registered;
   (c) when it is found in the step (b) that said screen data is already registered, in response to an input of a requested screen identify data, retrieving from said table next screen data registered in association with the display screen data so as to read the next screen data from said file and displaying the screen data on said display; and
   (d) when it is found in the step (b) that said screen data is not beforehand registered as display screen data to said table, in response to an input of a requested screen identify data, transmitting the input data or data associated therewith to the external system in order to request next screen data or information specifying next screen data.

7. A screen display control method according to claim 6 wherein said external system is a host computer including screen data to be loaded in said table and other screen data.

8. A screen display control system of a terminal which has an input device and a display and which is connected via a communication line to an external system comprising:
   a file of screen data and a table to which correspondence relationships between display screen data, screen identify input data, and next screen data are registered;
   means for checking whether or not screen data being displayed on said display is beforehand registered as a display screen to said table so as to judge whether or not said screen data is already registered;
   means responsive to a first result of said judge means for determining that said screen data is already registered in said table, in response to an input of a requested screen identify data from said input device, and retrieving from said table next screen data registered in association with the display screen data so as to read the next screen data from said file, and display the screen data on said display; and
   means responsive to a second result of said judge means for determining that said screen data is not beforehand registered as display screen data to said table, in response to an input of a requested screen identifying data from said input device, and transmitting the input data or data associated therewith to the external system to request and obtain next screen data or information specifying the next screen data.

* * * * *